Aug. 29, 1939.  G. E. MARKLEY  2,171,340
MATERIAL PROCESSING APPARATUS
Filed Jan. 28, 1938  3 Sheets-Sheet 1
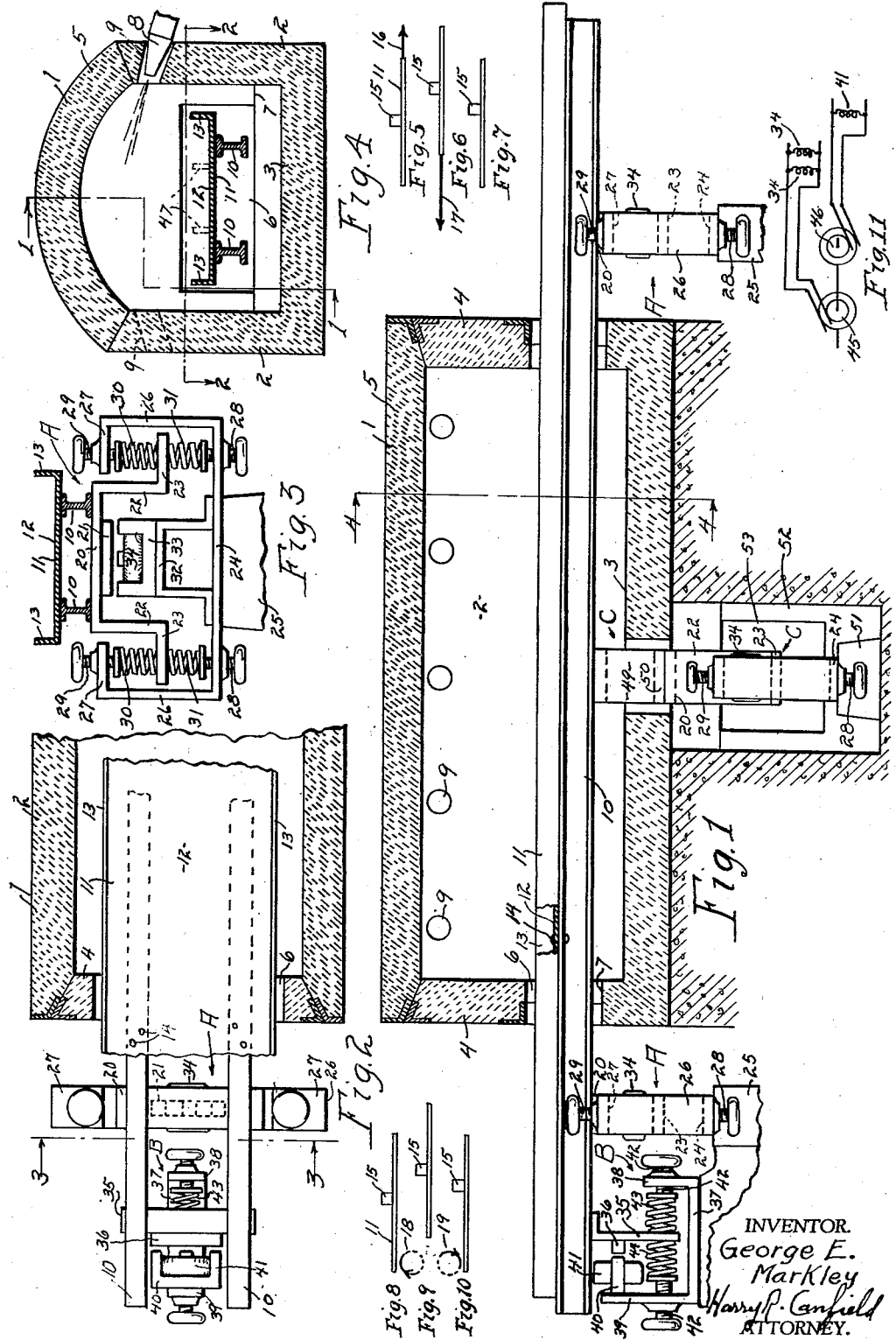
INVENTOR.
George E. Markley
Harry F. Canfield
ATTORNEY.

Aug. 29, 1939.  G. E. MARKLEY  2,171,340
MATERIAL PROCESSING APPARATUS
Filed Jan. 28, 1938  3 Sheets-Sheet 2
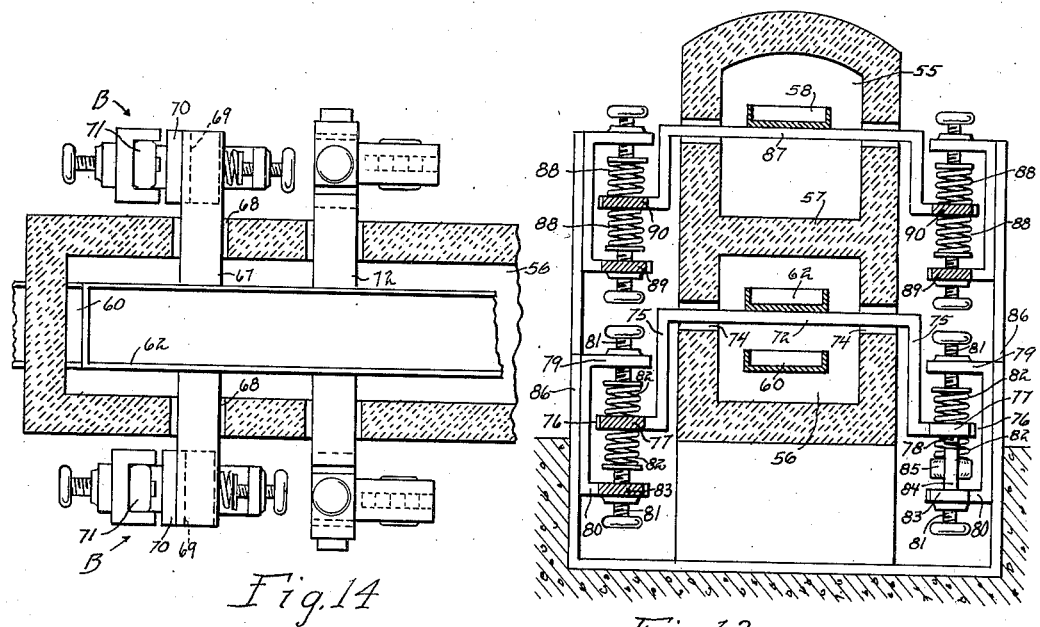
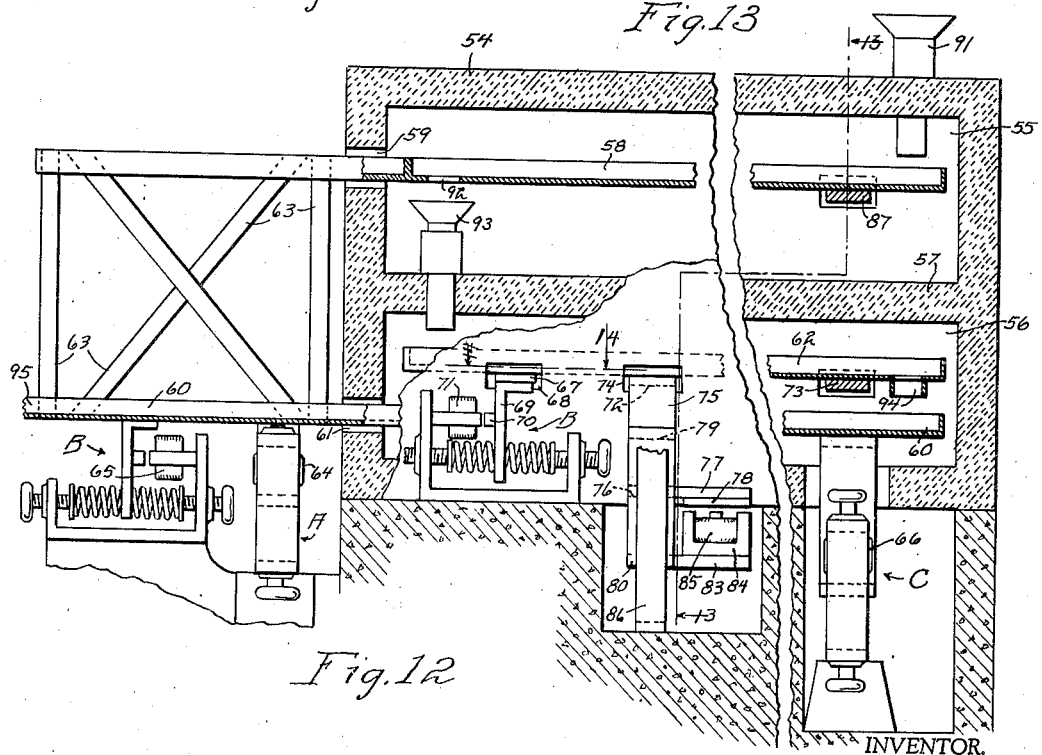
INVENTOR.
George E. Markley
BY Harry R. Canfield
ATTORNEY.

Aug. 29, 1939.  G. E. MARKLEY  2,171,340
MATERIAL PROCESSING APPARATUS
Filed Jan. 28, 1938   3 Sheets-Sheet 3

INVENTOR.
George E. Markley
BY Harry R. Canfield
ATTORNEY.

Patented Aug. 29, 1939

2,171,340

UNITED STATES PATENT OFFICE 2,171,340

MATERIAL PROCESSING APPARATUS

George E. Markley, Cleveland Heights, Ohio

Application January 28, 1938, Serial No. 187,543

12 Claims. (Cl. 263—6)

This invention relates to apparatus for processing material, and is applicable to the various arts in which material is processed by heating, chilling, washing, treating chemically, etc.

In another aspect of my invention it relates to conveying means for progressively conveying material to be processed through a processing chamber, retort or the like.

Among the objects of the invention are:

To provide an improved processing apparatus comprising conveyor means for conveying material to be processed through a processing chamber, retort or the like;

To provide a processing apparatus comprising a mechanism for moving material to be processed through a chamber, retort, or the like, operable by electro-magnetic means in an improved manner;

To provide a conveyor or feeder mechanism for progressively moving, through a chamber, retort or the like, material to be processed and arranged to propel the material by subjecting it to vibrations in an improved manner;

To provide a chamber, retort or the like having improved means for progressively moving material therethrough while being processed or treated;

Other objects will be apparent to those skilled in the art to which my invention appertains.

My invention is fully disclosed in the following description taken in connection with the accompanying drawings in which Fig. 1 is a side elevational view, partly in section, of an apparatus embodying my invention, in association with a furnace, and the view may be considered also as taken from the plane 1—1 of Fig. 4;

Fig. 2 is a top plan view, partly in section, with a portion broken away, of the apparatus of Fig. 1, and the view may be considered also as taken from the plane 2—2 of Fig. 4;

Fig. 3 is a cross-sectional view taken from the plane 3—3 of Fig. 2;

Fig. 4 is a cross-sectional view taken from the plane 4—4 of Fig. 1;

Figs. 5, 6 and 7 are diagrammatic views, illustrating successive phases of a vibratory movement which may be utilized in the practice of my invention;

Figs. 8, 9 and 10 are views similar to Figs. 5, 6 and 7, illustrating another type of vibratory movement;

Fig. 11 is a diagram illustrating a means for energizing electro-magnets which may be employed in the practice of my invention;

Fig. 12 is a side-elevational view, partly in section, of another embodiment of my invention;

Fig. 13 is a cross-sectional view taken from the plane 13—13 of Fig. 12;

Fig. 14 is a fragmentary longitudinal sectional view taken approximately from the plane 14—14 of Fig. 12;

Figure 15:
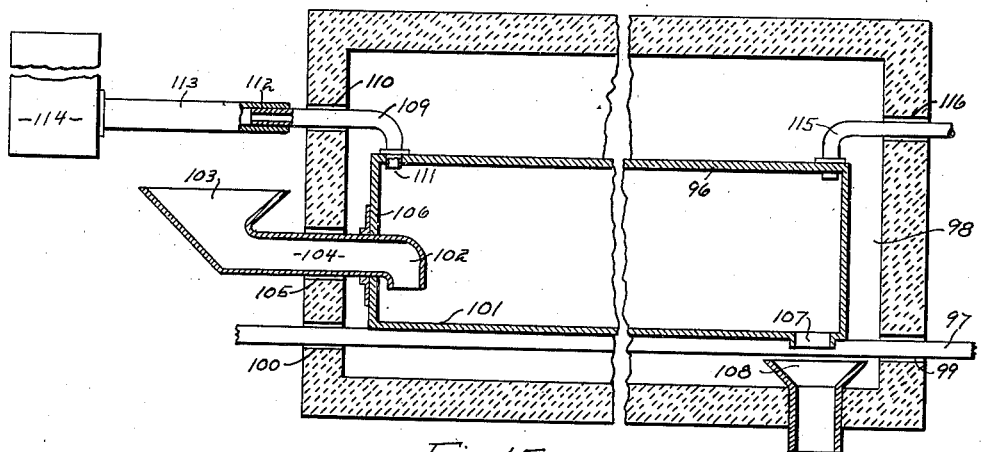
Figs. 15, 16 and 17 are respectively longitudinal sectional views of other embodiments of my invention.

My invention will first be described herein as applied to a furnace, in which material is heated while moving progressively therethrough.

Referring to the drawings, Figs. 1 to 11, I have shown at 1 in general a furnace of the industrial type comprising side walls 2—2, a bottom wall 3, end walls 4—4 and an arched top wall 5.

The end walls 4—4 have relatively large openings 6—6 therein, preferably in alignment with each other and rectangular in form as shown in Fig. 4 for a purpose to be described; and the end walls 4—4 may be constructed in the form of doors and the openings 6—6 may be provided in the form of notches in the lower edges of the doors, the said lower edge of one door being shown in Figs. 4 to 7. The doors, by being removable, give access to the interior of the furnace.

The furnace 1 may in general be constructed, by well known principles, from refractory material or may have a refractory lining; and the interior thereof may be heated in any suitable manner, for example, by a plurality of burners (one of which is shown at 8), projected into staggered openings 9—9 in the side walls 2—2. At 10—10 is a pair of metal beams which, in the embodiment illustrated, are I-beams, but which may be of other form, and supported upon the beams 10—10 is a pan 11, having a bottom 12, and side walls 13—13.

The beams, supported in a manner to be described, extend entirely through the furnace, projecting at opposite ends outwardly through the openings 6—6, and the pan 11 preferably also extends through the furnace having end portions outwardly thereof at each end.

The beams are supported so that they may be vibrated longitudinally or concurrently longitudinally and vertically and transmit their vibratory movement to the pan. The pan may be secured to the beams in any suitable manner, for example, by bolts 14—14. Material to be heated in the furnace is placed in the pan, for example, in that portion of the pan projecting from the left-hand end of the furnace, as viewed in Figs. 1 and 2, and the vibrations given to the beams and transmitted to the pan are of such nature that the material is thereby moved forwardly on the pan bottom as shown in Fig. 7 into the furnace, and out through the opposite opening, and onto the portion of the pan bottom projecting from the right hand end of the furnace; and may then either be picked up out of the pan or allowed to discharge by gravity from the end of the pan into a suitable receptacle or upon a suitable conveyor or the like, not shown.

Various types of vibratory motion may be given to the pan 11. For example, it may be reciprocated longitudinally with rectilinear vibratory movement. Such a movement is illustrated diagrammatically in Figs. 5, 6 and 7. The pan is here represented at 11, and an object 15 is shown supported thereon in an intermediate position. The pan is given a movement toward the right, starting from rest, accelerating and then decelerating again to rest, and having an average velocity represented by the length of the vector 16. This movement of the pan is such that the friction between the pan and the object 15 is sufficient to accelerate the object through a substantial part of the movment, and the object 15 moves with the pan to the position shown in Fig. 6. A return reciprocatory movement is then given to the pan 11, the average velocity of which is greater than before and represented by the vector 17, Fig. 6, the pan returning as shown in Fig. 7 to its original position, and this movement is such that the frictional engagement of the pan with the object is not sufficient to accelerate it at a rate at which it can keep up with the rapidly moving pan, and the pan therefore moves a substantial amount relative to the object 15, so that the object occupies a more forward position on the pan. By repeated reciprocatory movements of this character the object 15 will occupy successive positions farther and farther forward on the pan and will ultimately travel its full length.

In Figs. 8, 9 and 10 is illustrated diagrammatically another type of movement. Here again, an object 15 is supported on an intermediate part of the pan 11. The pan is given a vibratory movement which, in this case, is generally a circle, as shown at 18. The pan is moved forwardly by movement represented in Fig. 8 by the solid line portion of the circle 18 and carries the object 15 with it, going from the position of Fig. 8 to that of Fig. 9. The movement of the pan is, in general, upwardly and forwardly and causes the object 15 to be accelerated and to adhere to and move with the pan.

When the pan returns, going from Fig. 9 to Fig. 10, the path of movement is along the solid line portion of the circle 19, Fig. 10, according to which the pan moves downwardly with respect to the object 15, and then rearwardly under it and on the downward movement either leaves it (if the velocity of the pan becomes greater than the gravity acceleration of the object) or reduces the friction between the object and the pan, so that the rearward movement of the pan is relative to the object, and the object 15 becomes nearer the forward end of the pan 11 as shown in Fig. 10.

From the foregoing it will be clear without further illustration that the object 15 would be moved along the pan if the movement of the pan followed an elliptical path having its major axis either vertical or horizontal or at an inclination to the horizontal; and also if the movement of the pan were reciprocatory and followed a straight line at an inclination to the horizontal.

Various means may be provided to move the beams 10—10 and the pan 11 with either rectilinear reciprocatory or closed path movements as described. One such means is illustrated in the drawings and will now be described.

In Figs. 1, 2 and 3, illustrated generally at A, is a device for producing up and down movements of the pan. It comprises a bar 20 secured to the underside of the beams 10—10; and on the underside of the bar is secured the armature 21 of an electro-magnet. The bar 20 has depending portions 22—22 at the ends of which are outwardly laterally extending arms 23—23.

A bar 24, supported at an intermediate portion upon a stationary foundation 25, has upwardly extending portions 26—26 thereon terminating in inwardly extending arms 27—27. Screws 28—28 are threaded upwardly through the bar 24, and screws 29—29 are threaded downwardly through the arms 27—27, the screws thus being provided in pairs, the screws of each pair being in axial alignment.

Springs 30—30 are provided between the inner ends of the screws 29—29 and the arms 23—23; and springs 31—31 are provided between the inner ends of the screws 28—28 and the arms 23—23.

The I-beams 10—10 and the pan 11 thereon are thus supported, through the arms 23—23, upon the lower springs 31—31.

Upon a bracket 32 resting upon an intermediate portion of the bar 24 and supported by the foundation 25, is a three-pole electro-magnet 33 having a winding 34, the poles of the magnet being arranged in spaced relation to the armature 21.

As shown in Fig. 1, a device A, as just described, is provided under both of the opposite end portions of the beams 10—10 externally of the furnace 1, and each device has a winding 34. The windings are arranged to be energized by alternating current in phase with each other as shown in Fig. 11. Inasmuch as the alternating current is undulating in character, the magnets 33 will be periodically energized and will periodically attract the armatures 21—21, and the motion of the armature will be communicated through the bears 10—10 to the bar 20, and thence to the pan 11.

Upon attraction of the armature, the springs 31—31 will be compressed and the pan depressed and when the attraction ceases, the arms 23—23 will be moved upwardly by the springs 31—31 to retract or elevate the armature and the pan and compress the springs 30—30, which in turn will expand when the armature 21 is again attracted. It thus follows that a periodic up and down movement of the pan will be produced.

By adjustably turning the screws either the tension of the springs or the distance between the magnet and its armature or both in each case may be adjustably varied.

To assist the magnet and to render the action uniform, the springs 30 and 31 are preferably adjusted to correspond to the inertia of the parts being moved so that the parts will move with a natural periodicity synchronized with the periodicity of the current energizing the magnets, and the movement will therefore be maintained as a vibratory movement of substantially natural periodicity by the successive attractions on the armature 21.

As shown in Figs. 1 and 2, a similar device, identified generally by the character B, is provided at one end of the beams 10—10 the left end as viewed in the drawings to vibrate them longitudinally. Such means comprise a bracket 35 depending from the underside of the beams having secured thereto an armature 36. A bar 37 is mounted on the stationary base 25 and has upwardly extending arms 38 and 39. At the upper end of the arm 39, a three-pole magnet 40 is secured, having its poles confronting the armature 36, and having a winding 41. Screws 42—42 are threaded inwardly in co-axial alignment with each other through the arms 38 and 39, and springs 43 and 44 are mounted at their inner ends upon the bracket 35 and at their outer ends on the inner ends of the screws 42—42.

The springs 43 and 44 and armature 36 are adjusted by the screws as described above for the other devices, so that the beams 10—10 and the pan 11 may vibrate with a natural periodicity longitudinally, corresponding to the periodicity of the supply current; and the winding 41 of the magnet is arranged to be energized with alternating current out of phase with the current energizing the magnets 34—34, by the arrangement shown in Fig. 11, wherein the current from the generator 45 is out of phase with that of the generator 46.

As will be seen from the above described arrangement, the springs 31—31 normally support the beams and pan as well as contribute to their vibratory movement, but the springs 43 and 44 contribute to their vibratory movement only.

As will now be clear, when the magnet winding 41, of the device B, is energized with alternating current out of phase with that energizing the windings 34—34, of the devices A—A, the up and down movement of the beams and pan will be out of phase with the horizontal movement and the beams and pan will move in a closed path of movement. If the windings 34—34 are not energized, the winding 41 will cause the beams and pan to reciprocate rectilinearly horizontally. If all of the windings are energized in phase with each other, the beams and pan will reciprocate rectilinearly, but in a direction at an angle to the horizontal. In general, but particularly when the pan is to be reciprocated horizontally, the magnets may advantageously be caused to attract their armatures at a greater average velocity than that at which the springs retract the armatures. This may be arranged for by providing low inductance quick acting magnets and suitably adjusted springs.

The beams and pan may be caused to move along movement paths of other and various shapes than those referred to, by the means described, by utilizing various phase displacements of the magnetic energizing currents, as will be understood by those skilled in the art.

When the frequency of the cyclical movement above described is greater than desired when using alternating current at the frequencies commonly available, the frequency at which the magnets are energized may be reduced by utilizing the modulating system and apparatus constituting the subject matter of my Patent No. 1,964,265, issued June 26, 1934.

While I have shown the pan 11 as disposed horizontally on the beams 10—10 and have shown the beams 10—10 themselves as horizontal, it will be understood that they may be inclined.

The pan 11 may be subdivided by longitudinal walls 47—47 as shown in Fig. 4, whereby different kinds of articles may be moved through the furnace simultaneously without liability that they will become mixed with each other.

The surface of the pan 11 upon which the articles rest is preferably a smooth surface such as would naturally exist upon a pan made from sheet metal and subjected to the heat of the furnace, but if desired the pan bottom may be roughened; or the pan bottom may be made from screen fabric, or perforated or slotted metal.

When the heating of the articles to be moved through the furnace is to be maintained for a long time, the furnace will have relatively great length, and it may become desirable to support the beams 10—10 intermediate of their ends and within the furnace. When this is desired, devices such as that illustrated generally at C, Fig. 1, may be employed at one or more points longitudinally of the beams. The device C comprises a bracket 49 secured to the undersides of the beams and extending downwardly therefrom and terminating in a cross member 50, secured to which is a bar 20, which may be similar to that described for the device A. Here, associated with the bar 20, may be assembled the other parts of the device A described in connection with Figs. 1, 2 and 3 above. The bar 24 constituting part of said assembly may rest upon a stationary foundation 51. In other words, a support substantially identical to that supporting opposite ends of the beams 10—10 may be provided at spaced points intermediate of said end supports, and said intermediate support may be contained in a recess or cavity 52 in the foundation supporting the furnace whereby only the bracket 49 will be subjected to the heat of the furnace. A door 53 in the side of the foundation may be provided to give access to the screws 28 and 29 to adjust them.

The windings 34 of said intermediate supporting device or devices C may be energized in phase with the other windings 34 as described so that all longitudinal portions of the beams 10—10 will be vibrated in substantial unison.

While I have illustrated the pan 11 as supported on beams 10—10 and have arranged the magnets to vibrate the beams, it will be understood that the vibratory movement may be communicated directly to the pan and the beams may be dispensed with, for example by attaching the bar 20 and the bracket 35 directly to the pan bottom.

In the embodiment of my invention illustrated in Figs. 12, 13 and 14, a plurality of pans are provided and the material to be processed moves over the several pans successively, whereby the material may be subjected to different treatments in different parts of an enclosing chamber.

Referring to Figs. 12 to 14, I have shown at 54 a walled structure having an upper chamber 55 and a lower chamber 56 separated by a wall or floor 57. The whole structure may be constructed like a furnace from refractory material if desired. Means not shown may be provided to heat either or both of the chambers 55 and 56, or the material treating process may be one not requiring any heating of the chambers.

An upper pan 58 extends longitudinally of the upper chamber 55 and extends outwardly therefrom through an opening 59 in the chamber and wall. A lower pan 60 extends longitudinally of the lower chamber 56 and extends outwardly therefrom through an opening 61 in the end of the chamber.

An intermediate pan 62 extends longitudinally of the lower chamber being disposed above the lower pan 60.

The outer ends, the left ends as viewed in Fig.

12, of the pans 58 and 60 are connected by a rigid framework 63 so that these pans move in unison.

Under the outer end of the pan 60 is a device A having a magnet winding 64 for supporting and vibrating vertically that end of the pans 58 and 60; and similarly a device B having a magnet winding 65, is provided under the outer end of the pan 60 for vibrating the pans 58 and 60 longitudinally or horizontally.

A device C having a magnet winding 66, supports and vibrates vertically the opposite or inner end of the pan 60 which in this case is within the chamber 56.

The devices A, B, and C referred to may be identically like or similar to the devices having these same reference characters in the form of Figs. 1 to 11, and are so illustrated, and it is believed that no further description thereof is necessary.

A bar 67 is secured to the underside of the pan 62 and extends laterally outwardly through openings 68—68 in the side walls of the chamber 56 and has depending brackets 69—69 secured thereto upon opposite end portions of which, externally of the chamber, are mounted armatures 70—70. The brackets 69 and armatures 70 are parts of devices B having windings 71 which may be identical with or similar to the devices B described above comprising windings 65.

As will now be clear the devices de-energized by the windings 71—71 will vibrate the pan 62 longitudinally.

A pair of longitudinally spaced bars 72 and 73 are secured to the underside of the pan 62 and extend transversely thereof and out through openings in the side walls of the chamber 56. Both bars are shown in Fig. 12, and the bar 72 is shown in Fig. 13. The bars 72 and 73 and parts associated therewith may be substantially identical, and for simplicity of the drawings the parts associated with the bar 72 only are shown. The bar 72 extends through openings 74—74 in the side walls of the chamber 56 and outwardly thereof extends downwardly in the form of arms 75—75 and has, on the lower ends of the arms, brackets 76—76. Extending longitudinally from the brackets 76—76 are arms 77—77 carrying armatures 78.

Above and below the brackets 76—76 are arms 79 and 80 having screws 81—81 therein which compress springs 82—82 upon opposite sides of the brackets 76—76 thus supporting the brackets and the bar 72 and the pan 62 for vertical vibratory movements. The said arm 80 has extending laterally therefrom an arm 83, supporting a magnet 84 having a winding 85 by which the armature 78 is attracted periodically. The arms 79 and 80 are rigidly supported upon a stationary framework 86. Thus when the magnets 84—84 are energized with undulating electric current it will vibrate the pan 62 vertically.

The pan 62 may be of any desired length and the bars 72 and 73 spaced longitudinally thereon to vibrate all parts of the pan.

A bar 87 is secured to the underside of the pan 58 supporting its inner end in the chamber 55, the bar being mounted at opposite ends externally of the chamber on pairs of upper and lower springs 88—88, as shown in Fig. 13, and by means of longitudinally extending arms 89—89, which may support magnets and by means of longitudinally extending arms 90—90 which may support armatures, the bar 87 and the inner end of the pan 58 may be vibrated vertically; and the arrangement may be similar to or identical to that described for vibrating the bar 72.

It will be observed that the device B for vibrating longitudinally the pans 60 and 58 is turned end for end with respect to the device B of the form of Fig. 1, so that material on the pans 58 and 60 will move toward the left as viewed in Fig. 12 instead of toward the right as viewed in Fig. 1; but that the devices B vibrating longitudinally the pan 62 will cause material to travel toward the right on that pan.

In the practice of the embodiment shown in Figs. 12 to 14, material is introduced through a funnel form spout 91, through the top of the chamber 55 and discharged onto the inner end of the pan 58. Vibrations of this pan, as more fully described in connection with Figs. 1 to 11, cause the material to move over the pan toward the left as viewed in Fig. 12, and it discharges downwardly through an opening 92 in the bottom of the pan into a funnel-shaped spout 93 through which it flows through the intermediate floor 57 and at its lower end discharges into the lefthand end of the pan 62. The material then flows toward the right over the pan 62 and at the right hand end of the pan discharges downwardly through a spout 94 and upon the right hand end of the pan 60. The material then moves toward the left over the pan 60 out of the lower chamber 56 and may be discharged out of the left end portion 95 of the lower pan 60.

As will be apparent, the treatments given to the material in the chambers 55 and 56 may be treatments of different character inasmuch as the two chambers are isolated from each other by the wall 57. Also it will be obvious that whereas, with the arrangement shown, the material travels three times over the length of the chambers, any desired number of traversals of this distance may be had by the provision of additional pans and the vibratory movement therefor.

In the embodiment of my invention illustrated in Fig. 15, a material container 96, which may be referred to as a retort, is supported upon a beam or beams 97. The retort 96 is enclosed within a walled chamber 98 and the beam 97 extends longitudinally outward through the end walls of the chamber through openings 99 and 100. Means not shown is provided to support and vibrate the beams 93 with vibratory movement of such character as to cause material on the lower wall 101, of the retort 96 to flow toward the right thereover, as view in the drawings, and such means may be devices B and A, described above, and it is believed no further illustration thereof is necessary.

Material is supplied upon the bottom wall 101 of the retort through a spout 102 having a hopper form entrance 103, the spout having a horizontal shank portion 104, which projects through an opening 105 in the end wall of the chamber, and is secured rigidly to the adjacent end wall 106 of the retort. When the retort is vibrated the spout 102 vibrates with it in the opening 105.

At the opposite end of the retort, material on the bottom wall 101 discharges downwardly through an opening 107 in the bottom wall into a funnel-shaped spout 108 which conducts it outwardly through the bottom wall of the chamber 98.

A conduit 109 extends longitudinally through one end wall of the chamber 98 through an opening 110 and communicates as at 111 with the interior of the retort 96. This conduit may have a sliding connection as at 112 with a flexible supply conduit 113 connected to a source of supply of fluid 114. The opposite end of the retort 96 communicates with a discharge conduit 115, extending longitudinally through an opening 116 in the end wall of the chamber 98.

The conduits 109 and 115 may be rigidly connected to the retort and vibrate therewith in the openings 110 and 116 respectively.

In the practice of this embodiment of my invention, the retort 96 may be a closed and sealed retort and if desired it may be heated by heat supplied to the interior of the chamber 98 by means not shown, but which may be burners as described in connection with the form of Figs. 1 to 11. When the retort 96 is vibrated as referred to, material introduced into the hopper 103 will flow continuously over the bottom wall 101 of the retort, and whether heated or not, the material may be subjected to the action of any desired fluid from the source 114, such for example as a gas or liquid flowing into the retort through the conduit 109 and being discharged therefrom by the conduit 115.

Figure 16:
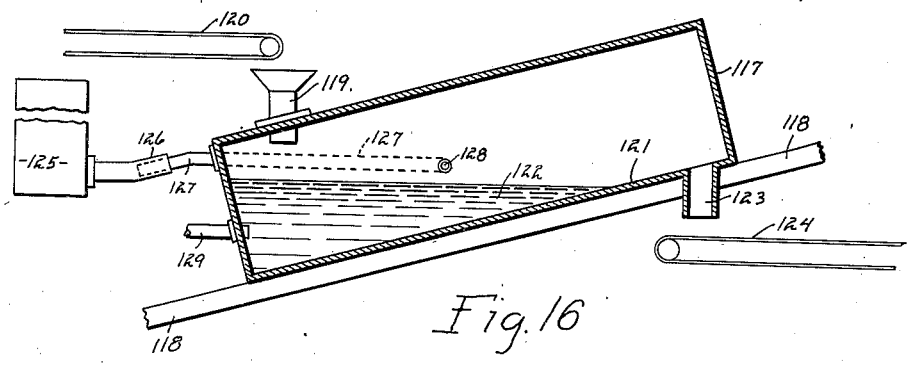

In the embodiment of my invention illustrated in Fig. 16, a closed retort 117 is supported upon and vibrated by a beam 118. Material is introduced continuously into the retort through a spout 119, and the material may be continuously supplied to the spout by a conveyor belt 120. The lower wall 121 of the retort is disposed at an inclination and the direction of the vibrations communicated to the retort by the beam 118 is such as to cause material to travel toward the right over the bottom wall of the retort. By thus inclining the bottom wall of the retort liquid 122 may be provided in the retort so that the material falling from the spout 119 will fall through the liquid and upon the bottom wall of the retort and then will move toward the right over the bottom wall and come out above the liquid and be discharged downwardly through an opening 123 in the bottom wall, whence it may be conveyed away by a belt conveyor 124.

The liquid 122 may be continuously renewed or from time to time changed by supplying it from a source of supply 125 through a sliding joint flexible connection 126 to a conduit 127 secured to the retort 117 and opening into the retort 117 at 128 and a conduit 129 may discharge the liquid therefrom.

In both this form and in the form of Fig. 15, the sliding joint connections 126 and 112 respectively are not essential. Any flexible conduit may be substituted therefor which will permit vibration of that part of the conduit connected to the vibrating retort without interrupting the flow of fluid.

Figure 17:
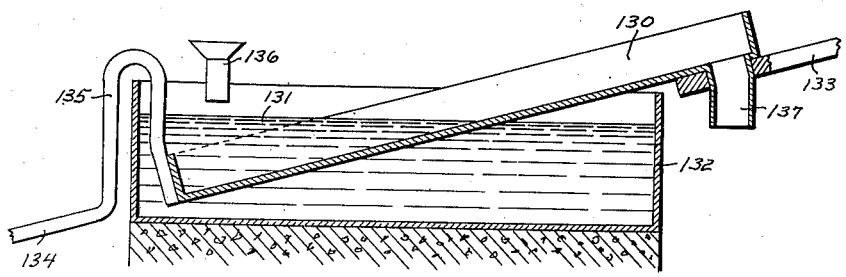

In the embodiment of my invention illustrated in Fig. 17, a pan or like device 130 is provided disposed at an inclination. One end, the left end as viewed in the drawings, is immersed in liquid 131 contained in a vessel 132, and the other end of the pan projects out of the liquid and out of the vessel. The pan 130 is supported at opposite ends by beams 133—134, preferably aligned, and means such as the devices A and B are provided to vibrate and support the beams 133, 134, and therefore the pan 130. The beam 134 may have a portion 135 of loop form by which it may be looped over the end wall of the vessel 132 and connected to the immersed end of the pan 130.

In the practice of this embodiment of my invention, material to be treated is supplied through a spout 136 and flows downwardly through the liquid and upon the lower end of the pan 130, and the vibration of the pan causes the material to move toward the right, as viewed in the drawing, and out of the liquid, finally discharging downwardly through a conduit 137 at the upper end of the pan.

In both the forms of Fig. 16 and Fig. 17, it will be apparent that any desired treatment of material by liquid may be performed. Furthermore, it will be apparent that the conduits 109 and 115 of the form of Fig. 15 may be, if desired, connected to the retort 117, of Fig. 16, to provide any desired gaseous material-treating medium in the retort 117 above the level of the liquid 122.

Furthermore, it will be apparent that the retort 117, of Fig. 16, may be subjected to heat by enclosing it within a chamber such as that shown in Fig. 15 for the retort 96.

Furthermore, while I have referred to treating material by application of heat in the several forms above described it is understood that it may conversely be treated by chilling it, in which case the chambers of Figs. 1, 12 and 15 would be refrigerated by any well known means, which it is believed unnecessary to show.

My invention is not limited to the exact details of construction illustrated and described above nor to the particular means illustrated and described for producing the vibratory motions. Many modifications and changes may be made within the spirit of my invention, and my invention is inclusive of all other changes and modifications which come within the scope of the appended claims.

I claim:

1. In a material processing apparatus, a walled container constructed to contain a material treating fluid medium, an elongated bed having a forwardly and rearwardly extending surface in the container for carrying thereon material to be treated by the fluid medium, spring means supporting the bed and reacting thereon and arranged to cause the bed to have a natural vibratory movement periodicity determined by the spring means, means arranged to apply to the bed periodically recurring force impulses the periodicity of which corresponds to the said natural periodicity of the bed to cause the bed to vibratingly move at substantially the said natural periodicity, the effective direction and magnitude of the force impulses being predetermined to cause the surface to repeatedly carry material thereon with it in the forward direction further than in the rearward direction to thereby cause the material to progressively move over the surface through the fluid medium in the container.

2. In a material processing apparatus, a walled container constructed to contain a material treating fluid medium, an elongated bed having a forwardly and rearwardly extending surface in the container for carrying thereon material to be treated by the fluid medium, spring means supporting the bed and reacting thereon and arranged to cause the bed to have a natural vibratory movement periodicity determined by the spring means, means arranged to apply to the bed periodically recurring force impulses the periodicity of which corresponds to the said natural periodicity of the bed to cause the bed to vibratingly move at substantially the said natural periodicity, the effective direction and magnitude of the force impulses being predetermined to cause the surface to repeatedly carry material thereon with it in the forward direction further than in the rearward direction to thereby cause the material to progressively move over the surface through the fluid medium in the container, and means to conduct material to be treated to one portion of the surface, and a more forward portion of the surface being arranged to discharge material therefrom.

3. The apparatus described in claim 1 and in which the direction and magnitude of the said force impulses are predetermined to cause the movement of the bed to have a longitudinal component in the forward direction at a lower velocity than in the rearward direction.

4. In a material processing apparatus, a walled container constructed to contain a material fluid treating medium, an elongated bed having a forwardly and rearwardly extending surface in the container for carrying thereon material to be treated by the fluid medium, spring means supporting the bed and reacting thereon and arranged to cause the bed to have natural vibratory movement periodicities in the longitudinal direction of the bed and in a direction at an angle thereto respectively determined by the spring means, means arranged to apply to the bed in the longitudinal direction and in a direction at an angle thereto concurrently, periodically recurring force impulses at periodicities corresponding respectively to the said natural periodicities of the bed to cause the bed to vibrate in said directions concurrently and at substantially the said respective periodicities, the phase relation and amplitude of the force impulses being predetermined to cause the said surface to repeatedly carry the material with it in the forward direction farther than in the rearward direction to thereby cause the material to progressively move over the surface through the fluid medium in the container.

5. The apparatus described in claim 4, and in which the said force impulses are displaced in phase relation so as to cause points in the bed to move in closed paths of movement.

6. The apparatus described in claim 4, and in which the said force impulses are displaced in phase relation to cause points in the bed to move along lines inclined at an angle to the longitudinal direction of the bed.

7. The apparatus described in claim 1, and in which the said means to apply the said force impulses is electro-magnetic means energized with undulating electric current.

8. The apparatus described in claim 4, and in which the said means to apply the said force impulses is electro-magnetic means energized with undulating electric current.

9. The apparatus described in claim 1, and in which electro-magnetic means is provided to exert, when energized, force impulses on the bed, and the said spring means is arranged to retract the bed when the electro-magnetic means is de-energized, and the electro-magnetic means is arranged to be energized by undulating electric current.

10. The apparatus described in claim 4, and in which a plurality of electro-magnets are provided to exert, when energized, said force impulses on the bed in said respective directions, and said spring means is arranged to retract the bed when the electro-magnets are de-energized, and the electro-magnets have windings arranged to be energized respectively with undulating electric current.

11. The apparatus described in claim 1, and in which the chamber is provided with openings in the walls thereof and the bed is provided with carrying means projecting outwardly through the openings and the spring means supports and reacts upon the carrying means.

12. The apparatus described in claim 4, and in which the chamber has openings in the walls thereof and the bed is provided with carrying means projecting outwardly through the openings and the spring means supports and reacts upon the carrying means.

GEORGE E. MARKLEY.